United States Patent [19]
Pena

[11] Patent Number: 5,723,815
[45] Date of Patent: Mar. 3, 1998

[54] RETRACTABLE ELECTRICAL EXTENSION CORD

[76] Inventor: Rolando Pena, 1105 Farm Rd., Secaucus, N.J. 07094

[21] Appl. No.: 713,006

[22] Filed: Sep. 12, 1996

[51] Int. Cl.$^6$ ........................................ H01H 9/02
[52] U.S. Cl. ............................ 174/53; 174/57; 174/135
[58] Field of Search .......................... 242/389, 397, 242/398; 439/501; 174/53, 57, 48, 50; 220/3.3, 3.7

[56] References Cited

U.S. PATENT DOCUMENTS

| | | | |
|---|---|---|---|
| 2,510,745 | 6/1950 | Kilgore | 174/48 |
| 3,852,514 | 12/1974 | Lauben | 174/58 |
| 4,114,736 | 9/1978 | Scherenberg | 191/12.4 |
| 4,467,979 | 8/1984 | Koehler | 242/96 |
| 4,969,610 | 11/1990 | Taylor et al. | 242/86.5 A |

Primary Examiner—Kristine L. Kincaid
Assistant Examiner—Dhiru R. Patel
Attorney, Agent, or Firm—Alfred C. Hill

[57] ABSTRACT

A wall mounted extendible and retractable electrical extension cord has an enclosed housing having a rear wall and a front wall parallel to the rear wall, the front wall having at least one aperture therein and the housing being secured to a wall of a building; an electrical extension cord having a predetermined length and an electrical connector on one end thereof, a portion of the electrical extension cord adjacent the one end thereof extending through the one aperture; a reel disposed within the housing between and parallel to the rear wall and the front wall to store the electrical extension cord thereon; an electrical power source coupled to the housing having at least a power terminal and a neutral terminal; and a mechanism disposed within the housing coupled to the reel, the electrical extension cord and the electrical power source to couple electrical power to the electrical extension cord, to enable pulling the electrical extension cord from the reel by the one end to a desirable length for use, to lock the reel when the electrical extension cord is at a desirable length, and to automatically retract the electrical extension cord back onto the reel after terminating the use thereof.

20 Claims, 3 Drawing Sheets

RETRACTABLE ELECTRICAL EXTENSION CORD

BACKGROUND OF THE INVENTION

The present invention relates to electrical extension cords and more particularly to a wall mounted extendible and retractable electrical extension cord.

Electrical extension cords are employed in many buildings for connection to appliances, such as, vacuum cleaners, radios, stereo systems and the like. It has been found that such extension cords are liable to be damaged by walking on them, the extension cords become tangled, the extension cords are too short or too long or they can be misplaced. It is also possible in the use of the known electrical extension cords of being pulled out of the receptacle from which the extension cord receives the electrical power during use of these prior art extension cords.

Known prior art includes:

U.S. Pat. No. 4,901,938 issued to D. G. Cantley disclosing an electrical cord retractor which is used to shorten the electrical cords associated with various appliances so that they do not become tangled and do not become damaged by walking on or tripping over;

U.S. Pat. No. 4,551,577 issued to N. R. Byrne disclosing a retractable power center for providing conveniently located electrical power source receptacles adapted to be mounted in a work surface, such as, a desk top or similar article;

U.S. Design Pat. No. 336,071 illustrating the design of a wall mountable extension outlet, but does not show any structure as to how the extension outlet is extended from or retracted into the wall mounted unit; and U.S. Pat. No. 4,579,403 issued to N. R. Byrne illustrating an electrical junction assembly for providing expansion and retraction of an electrical connector which enables conductive connectors to expand and retract to accommodate various interconnections between office furniture and the like.

None of the known prior art disclose an electrical extension cord that is always where it is left, always untangled and always stays plugged in.

SUMMARY OF THE INVENTION

An object of the present invention is to provide a wall mounted extendible and retractable electrical extension cord that will leave the extension cord where it is left, provides an extension cord that is always untangled and an extension cord that will stay plugged in.

Another object of the present invention is to provide a wall mounted extendible and retractable electrical extension cord that prevents accidents, since no exposed cords are present except when in use.

Still another object of the present invention is to provide a wall mounted extendible and retractable electrical extension cord where the extension cord is easily stored and eliminates the need for electrical adaptors.

Still a further object of the present invention is to provide a wall mounted extendible and retractable electrical extension cord that maintains a neat appearance in the room in which it is employed.

A feature of the present invention is the provision of a wall mounted extendible and retractable electrical extension cord comprising an enclosed housing having a rear wall and a front wall parallel to and spaced from the rear wall, the front wall having at least one aperture therethrough, the housing being secured to a wall of a building; an electrical extension cord having a predetermined length and an electrical connector on one end thereof, a portion of the electrical extension cord adjacent the one end thereof extending through the one aperture; a reel disposed within the housing between and parallel to the rear wall and the front wall to store the electrical extension cord thereon; an electrical power source coupled to the housing having at least a power terminal and a neutral terminal; and a mechanism disposed within the housing coupled to the reel, the electrical extension cord and the electrical power source to couple electrical power to the electrical extension cord, to enable pulling the electrical extension cord from the reel by the one end to a desirable length for use, to lock the reel when the electrical extension cord is at the desired length, and to automatically retract the electrical extension cord back onto the reel after terminating the use thereof.

Another feature of the present invention is to provide in addition to the structure mentioned hereinabove one or more electrical receptacles disposed in the front wall adjacent the aperture connected to the electrical power source.

Still a further feature of the present invention is the provision of a wall mounted extendible and retractable electrical extension cord as outlined hereinabove with the electrical power source being provided by an electrical wall receptacle having at least a power terminal and a neutral terminal with an electrical plug disposed in the rear wall of the housing having at least a power blade and a neutral blade capable of being plugged into the electrical wall receptacle and a fastening means to secure the housing in position on the wall of the building.

Still a further feature of the present invention is the provision of a wall mounted extendible and retractable electrical extension cord as outlined hereinabove with the housing thereof being supported behind the wall covering of a building between two adjacent studs supporting the wall covering of the building with the building electrical power cable being connected to the power terminal and neutral terminal within the housing of the present invention.

BRIEF DESCRIPTION OF THE DRAWING

Above-mentioned and other features and objects of the present invention will become more apparent by reference to the following description taken in conjunction with the accompanying drawing, in which.

DESCRIPTION OF THE PREFERRED EMBODIMENTS

Figure 1:
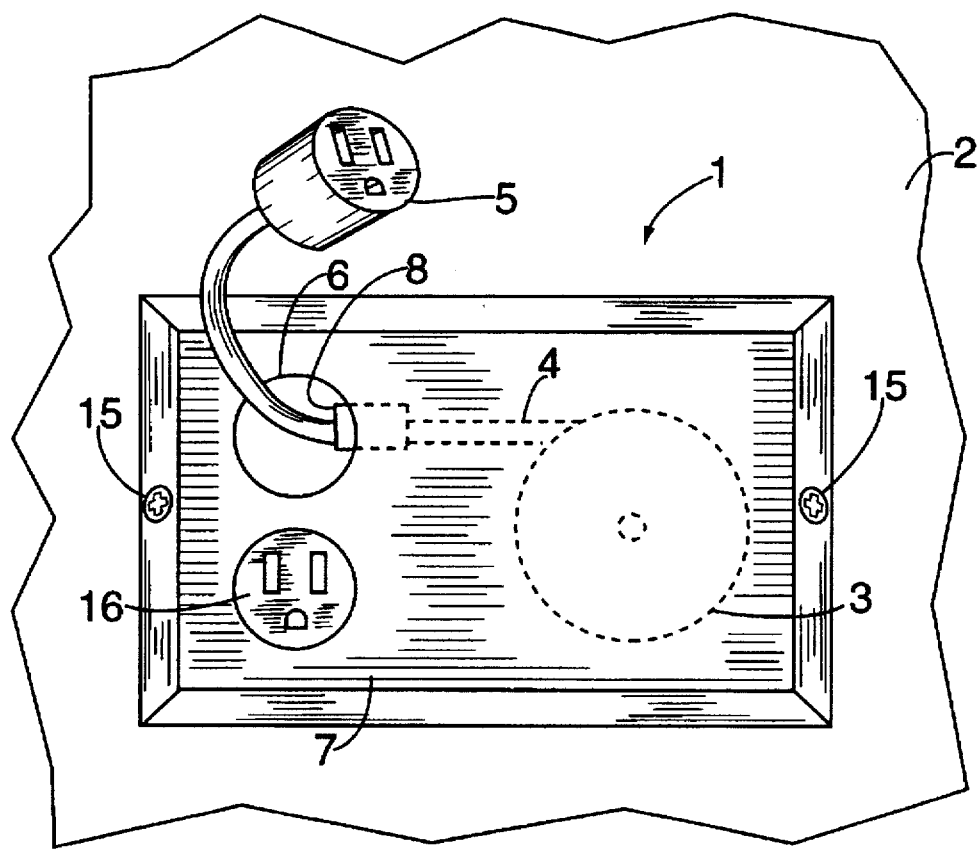
FIG. 1 is an elevational view of a first embodiment of the wall mounted extendible and retractable electrical extension cord supported by the wall of a building in accordance with the principles of the present invention.
Figure 2:
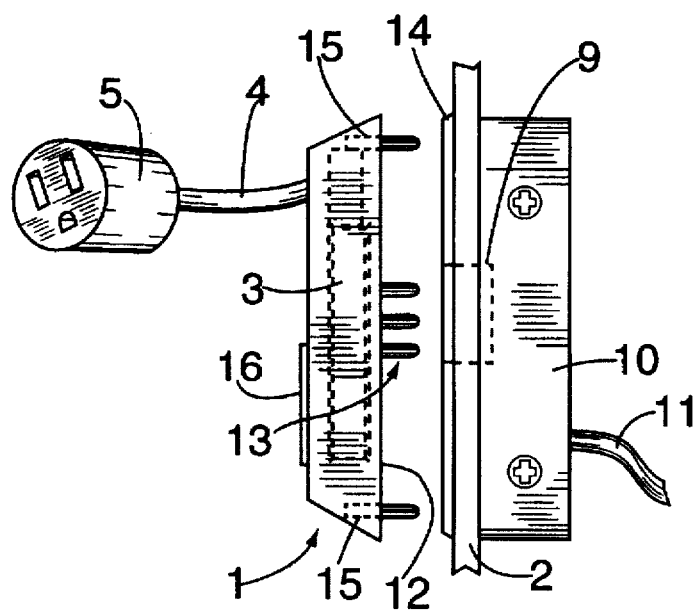
FIG. 2 is an exploded side view of the first embodiment of FIG. 1 in accordance with the principles of the present invention.

Referring to FIGS. 1 and 2, a first embodiment of the wall mounted extendible and retractable electrical extension cord in accordance with the principles of the present invention is illustrated as including enclosed housing 1 mounted to the exterior of a wall covering 2, such as sheet rock, of a building. Housing 1 includes therein a reel 3 which stores thereon, in an extendible and retractable manner, an electrical extension cord 4 having an electrical connector 5 secured thereon with the extension cord passing through an aperture 6 in the front wall 7 of the housing 1. To ease the passing of the extension cord 4 through the aperture 6, a pulley 8 is provided within housing 1 adjacent aperture 6 to ease the passing of the electrical extension cord 4 through the aperture 6 so as to not damage the outer covering of the electrical extension cord.

The electrical connector 5 could be a male connector, or a female connector, depending upon the application or use of the electrical extension cord 4.

The housing 1 is shown to be rectangular in FIGS. 1 and 2 as well as the other figures of the drawing, but it is possible to having the housing 1 in the form of a circle.

As best seen in FIG. 2, the power source to the extension cord 4 is provided by an electrical wall receptacle 9 mounted to the normal electrical box 10 having connected thereto the building power source through cable 11. The rear wall 12 of housing 1 has included therein an electrical plug 13, shown as a three pronged plug, one of which is for a ground connection to the electrical system of the building, which would be complimented in the receptacle 9. The plug 13 would be plugged into receptacle 9 and housing 1 secured to either the cover plate 14 of electrical box 10, or to the wall covering 2 directly by means of the screws 15 that are received in corresponding male connectors in the face plate 14, or in anchor bolts in the wall covering 2.

The housing 1, as shown in FIGS. 1 and 2, could also accommodate an electrical receptacle 16 to which an electrical cord from an appliance could be plugged into and provided with electrical power from the building electrical system through cable 11.

Figure 3:
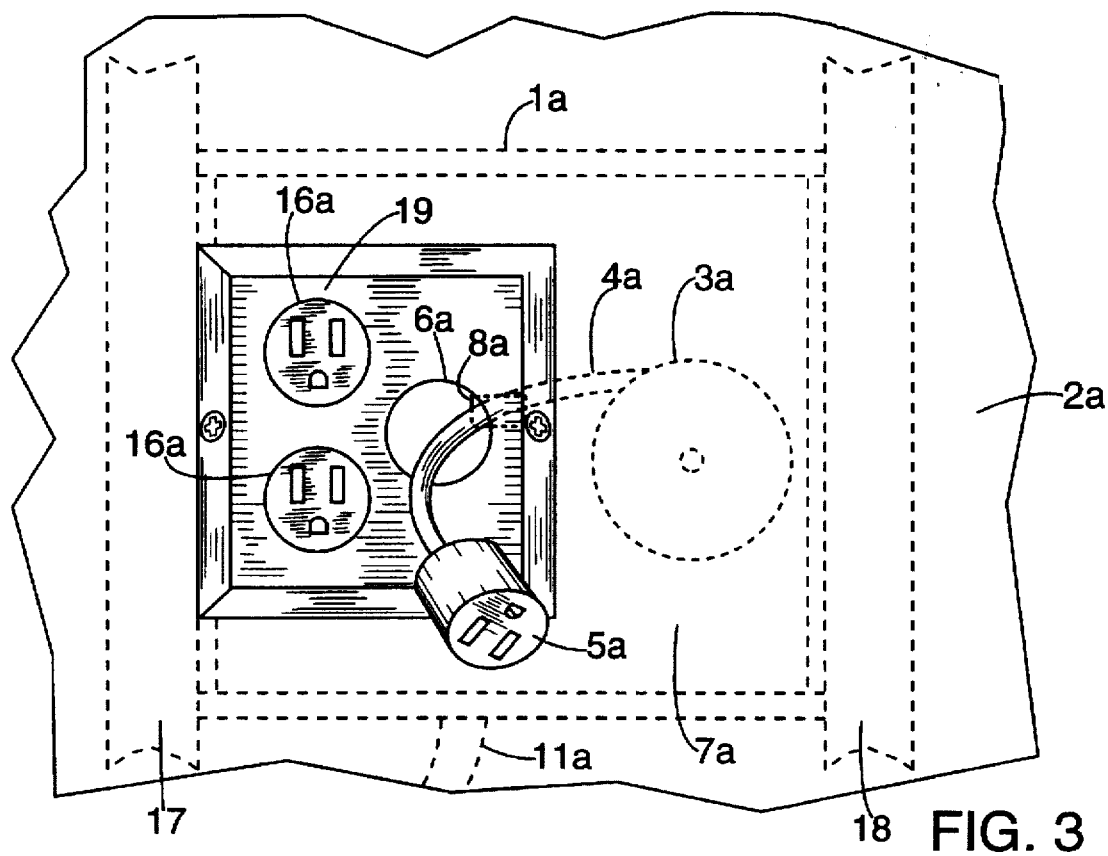
FIG. 3 is an elevational view of a second embodiment of the wall mounted extendible and retractable electrical extension cord in accordance with the principles of the present invention.

FIG. 3 illustrates a second embodiment of the wall mounted extendible and retractable electrical extension cord in accordance with the principles of the present invention. This embodiment includes the housing 1a secured to two studs 17 and 18 of a wall in a building with the studs 17 and 18 and the housing 1a being covered by a wall covering 2a, such as sheet rock, with a face plate 19 being provided on the front wall 7a to provide a decorative cover through which the electrical extension cord 4a can be pulled through aperture 6a with storage of the electrical extension cord 4a being on reel 3a. As in the first embodiment, the electrical extension cord 4a has an electrical connector 5a thereon to be connected to an appliance, or the like, when the extension cord 4a is to be used.

As with the embodiment of FIGS. 1 and 2, the embodiment of FIG. 3 can have one or more power receptacles 16a present in face plate 19 with these receptacles being connected to the building power source provided by cable 11a which is hard wired into housing 1a.

Figure 4:
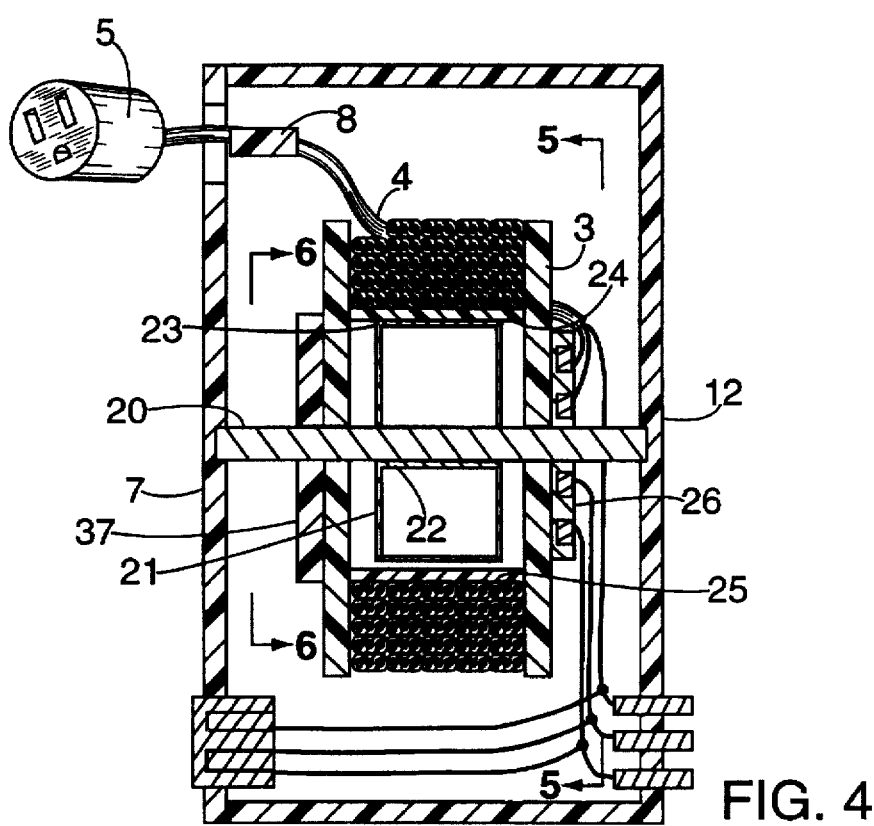
FIG. 4 is a cross sectional view of the embodiments of FIGS. 1 and 3 in accordance with the principles of the present invention.

Referring to FIG. 4, there is illustrated therein in greater detail the components within housing 1 that would be present in both the embodiment of FIGS. 1 and 2 and the embodiment of FIG. 3. It should be kept in mind, however, that the plug 13 in the rear wall 12 of the housing 1 of FIG. 2 would be replaced by a hard wire connection to the building cable 11a as shown in FIG. 3.

As illustrated in FIG. 4 there is associated with the reel 3, a mechanism coupled to the reel 3 and the electrical power source, such as plug 13 or the building power source in cable 11a to couple electrical power to the electrical extension cord 4, to enable pulling the electrical extension cord 4 from reel 3 by the end of extension cord 4 adjacent the electrical connector 5 to a desirable length for use, to lock the reel 3 when the electrical extension cord 4 is at the desirable length, and to automatically retract the electrical extension cord 4 back onto the reel 3 after terminating the use thereof. This mechanism includes an axle 20 extending between the rear wall 12 and the front wall 7 upon which the reel 3 is rotably mounted. Axial 20 is keyed into one of the front wall 7 and rear wall 12 to prevent rotation thereof. A flat spring 21 having one end 22 fastened to axle 20 and the other end 23 fastened to the interior 24 of hub 25 of reel 3 to enable placing spring 21 under tension when the electrical extension cord 4 is pulled from reel 3 to provide automatic retraction of the electrical extension cord 4 onto the reel 3 after terminating the use thereof.

Figure 5:
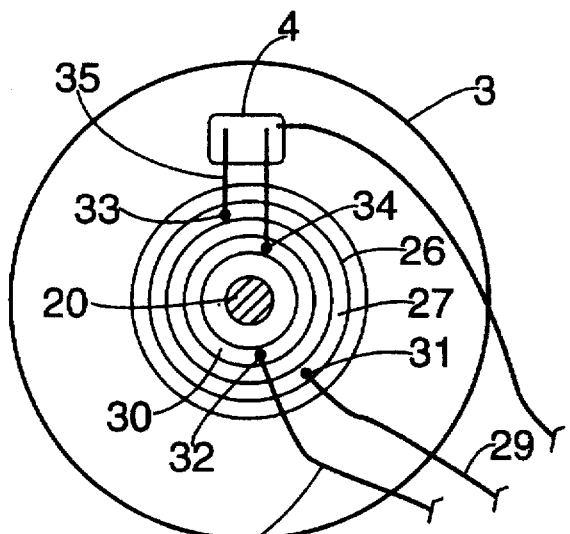
FIG. 5 is a view taken along line 5—5 of FIG. 4.

As best seen in FIG. 5 contact disc 26 is fastened to reel 3 adjacent rear wall 12 and contains thereon a first circular contact area 27 slidably coupled to one of the power terminal and the neutral terminal 28 and 29, respectively, and a second circular contact area 30 spaced from the first circular contact area 27 and slidably coupled to the other of the power terminal and neutral terminal 28 and 29, respectively, by means of sliding contacts 31 and 32. A second pair of sliding contacts 33 and 34 are coupled between the first and second circular contact areas 27 and 30 and the power and neutral leads 35 and 36 of the electrical extension cord 4 to supply power to electrical extension cord 4.

Figure 6A:
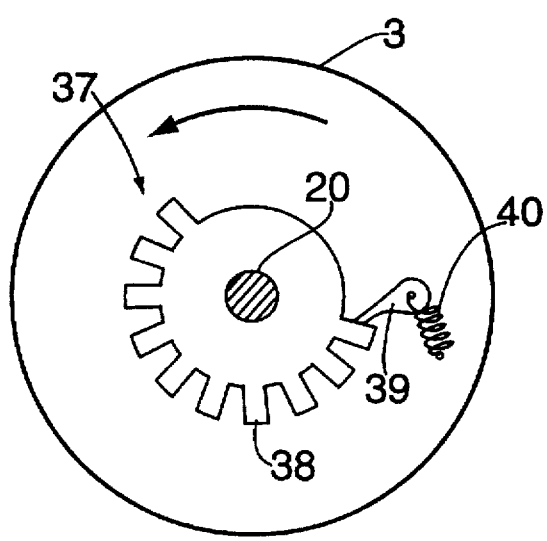
FIG. 6a, 6b, and 6c are views taken along line 6—6 of FIG. 4 showing various conditions of the mechanism to control the extension of the electrical extension cord, the locking of the electrical extension cord and the retraction of the electrical extension cord in accordance with the principles of the present invention.
Figure 6B:
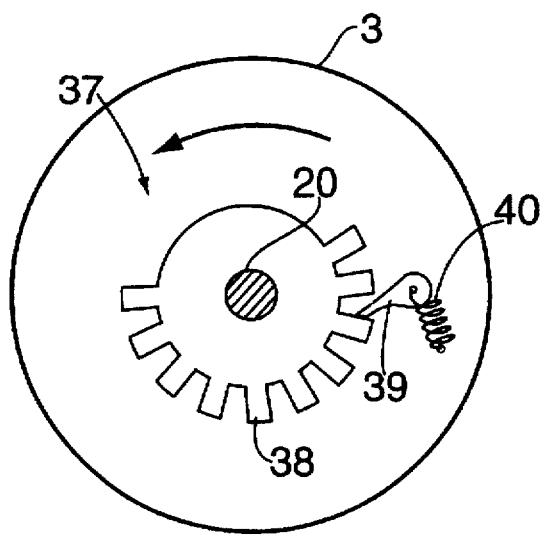
Figure 6C:
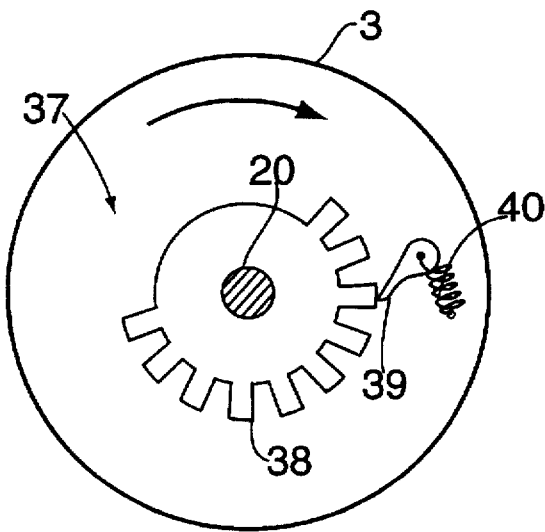

On the side of reel 3 adjacent the front wall 7 is disposed a cam-gear combination 37 best seen in FIGS. 6a-6c. This cam-gear combination 37 enables pulling the electrical cord 4 from reel 3 to a desirable length, to enable locking the reel 3 when the electrical extension cord 4 has reached the desirable length and to enable automatic retraction of the automatic extension cord 4 onto the reel 3 after use. The combination 37 includes a gear 38 and a cam 39 fastened to reel 3 spring loaded by a spring 40 fastened to reel 3. The relationship shown between gear 38 and cam 39 in FIG. 6a is the relative position of these two elements to enable unwinding or extending the electrical extension cord 4. The relationship between the gear 38 and the cam 39 shown in FIG. 6b is for locking the reel 3 when the electrical extension cord 4 is in use. The relative relationship between gear 38 and cam 39 as illustrated in FIG. 6c enables the unlocking and retracting of the electrical extension cord 4 onto reel 3.

As illustrated in FIGS. 1-5 the building power source and the electrical extension cord 4 is of the three wire type having a power wire, a neutral wire and a ground wire with its' associated terminals, leads and blades. Of course, the embodiments of FIGS. 1 and 3 can employ a two wire power source including only a power wire and a neutral wire eliminating a ground wire.

As illustrated in the drawings, the two embodiments of the wall mounted extendible and retractable electrical extension cord provides easy storage of the electrical extension cord with ease of installation and removes all of the common extension cord problems mentioned hereinabove under the "Background of the Invention".

The housing and the various components therein can be made of a plastic, but also the use of a lightweight metal, such as aluminum, would also be possible. It would be possible, although not shown in the drawings, to have a built in fuse to add to protection against short circuiting and, hence, would provide a fire hazard reduction.

While I have described above the principles of my invention in connection with specific apparatus, it is to be clearly understood that this description is made only by way of example and not as a limitation to the scope of my invention as set forth in the objects thereof and in the accompanying claims.

I claim:

1. A wall mounted extendible and retractable electrical extension cord comprising:

an enclosed housing having a rear wall and a front wall parallel to and spaced from said rear wall, said front wall having at least one aperture therethrough, said enclosed housing being secured to a wall of a building;

an electrical extension cord having a predetermined length and an electrical connector on one end thereof, a portion of said electrical extension cord adjacent said one end thereof extending through said at least one aperture;

a reel mounted on an axle extending between the rear and front walls and disposed within said enclosed housing between and parallel to said rear wall and said front wall to store said electrical extension cord thereon;

an electrical power source coupled to said enclosed housing having at least a power terminal and a neutral terminal; and a mechanism disposed within said housing coupled to said reel, said electrical extension cord and said electrical power source to couple electrical power to said electrical extension cord, to enable pulling said electrical extension cord from said reel by said one end to a desirable length for use, to lock said reel when said electrical extension cord is at said desirable length, and to automatically retract said electrical extension cord back onto said reel after terminating the use thereof.

2. An electrical extension cord according to claim 1, wherein said mechanism includes a flat spring disposed within said reel having one end fastened to said axle and the other end fastened to an interior of a hub of said reel to enable placing said flat spring under tension when said electrical extension cord is pulled from said reel to provide automatic retracting of said electrical extension cord onto said reel, a contact disc disposed coaxial of said axle and secured to said reel adjacent said rear wall having a first circular contact area coaxial of said axle and slidably coupled to one of said power terminal and said neutral terminal and a second circular contact area spaced from said first circular contact area coaxial of said axle and slidably coupled to the other of said power terminal and said neutral terminal, a pair of sliding contacts, one of said pair of sliding contacts being coupled between said first circular contact area and one of a power lead and a neutral lead of said electrical extension cord and the other of said pair of sliding contacts being coupled between said second circular contact area and the other of a power lead and a neutral lead of said electrical extension cord, and a cam-gear combination having a gear coaxial of said axle and secured to said reel adjacent said front wall to enable pulling said electrical extension cord from said reel to said desirable length, to enable locking said reel when said electrical extension cord has reached said desirable length, and to enable automatic retraction of said electrical extension cord onto said reel after use.

3. An electrical extension cord according to claim 2, further including a pulley disposed within said housing adjacent said at least one aperture in said front wall to ease the passing of said electrical extension cord through said at least one aperture.

4. An electrical extension cord according to claim 2, further including at least one electrical receptacle disposed in said front wall adjacent said at least one aperture connected to said electrical power source.

5. An electrical extension cord according to claim 2, further including a plurality of electrical receptacles disposed in said front wall adjacent said at least one aperture each connected to said electrical power source.

6. An electrical extension cord according to claim 1, wherein said electrical power source includes an electrical wall receptacle having at least said power terminal and said neutral terminal, an electrical plug disposed in said rear wall having at least a power blade and a neutral blade capable of being plugged into said electrical wall receptacle, and fastening means to secure said housing in position on said wall of said building.

7. An electrical extension cord according to claim 6, wherein said fastening means secures said housing to said electrical wall receptacle.

8. An electrical extension cord according to claim 6, wherein said mechanism includes a flat spring disposed within said reel having one end fastened to said axle and the other end fastened to an interior of a hub of said reel to enable placing said flat spring under tension when said electrical extension cord is pulled from said reel to provide automatic retraction of said electrical extension cord onto said reel, a contact disc disposed coaxial of said axle and secured to said reel adjacent said rear wall having a first circular contact area coaxial of said axle and slidably coupled to one of said power blades and said neutral blade and a second circular contact area spaced from said first circular contact area coaxial of said axle and slidably coupled to the other of said power blade and said neutral blade, a pair of sliding contacts, one of said pair of sliding contacts being coupled between said first circular contact area and one of a power lead and a neutral lead of said electrical extension cord and the other of said pair of sliding contacts being coupled between said second circular contact area and the other of a power lead and a neutral lead of said electrical extension cord, and a cam-gear combination having a gear coaxial of said axle and secured to said reel adjacent said front wall to enable pulling said electrical extension cord from said reel to said desirable length, to enable locking said reel when said electrical extension cord has reached said desirable length, and to enable automatic retraction of said electrical extension cord onto said reel after use.

9. An electrical extension cord according to claim 8, further including a pulley disposed within said housing adjacent said at least one aperture in said front wall to ease the passing of said electrical extension cord through said at least one aperture.

10. An electrical extension cord according to claim 8, further including at least one electrical receptacle disposed in said front wall adjacent said at least one aperture connected to said electrical plug.

11. An electrical extension cord according to claim 8, further including a plurality of electrical receptacles disposed in said front wall adjacent said at least one aperture each connected to said electrical plug.

12. An electrical extension cord according to claim 1, wherein said housing is secured within said wall of said building between two spaced studs located behind a wall covering, and said electrical power source includes
a building electrical power cable having at least a power conductor and a neutral conductor hard wired to said power terminal and said neutral terminal.

13. An electrical extension cord according to claim 12, wherein a portion of said front wall adjacent said at least aperture covers said wall covering and the remainder of said front wall is disposed behind said wall covering.

14. An electrical extension cord according to claim 13, further including at least one electrical receptacle disposed in said portion of said front wall connected to at least said power terminal and said neutral terminal.

15. An electrical extension cord according to claim 13, further including a plurality of electrical receptacles disposed in said portion of said front wall each connected to at least said power terminal and said neutral terminal.

16. An electrical extension cord according to claim 13, further including a pulley disposed within said housing adjacent said at least one aperture in said portion of said front wall to ease the passing of said electrical extension cord through said at least one aperture.

17. An electrical extension cord according to claim 12, wherein said mechanism includes a flat spring disposed within said reel having one end fastened to said axle and the other end fastened to an interior of a hub of said reel to enable placing said spring under tension when said electrical extension cord is pulled from said reel to provide automatic retraction of said electrical extension cord onto said reel, a contact disc disposed coaxial of said axle and secured to said reel adjacent said rear wall having a first circular contact area coaxial of said axle and slidably coupled to one of said power terminal and said neutral terminal and a second circular contact area spaced from said first circular contact area coaxial of said axle and slidably coupled to the other of said power terminal and said neutral terminal, a pair of sliding contacts, one of said pair of sliding contact being coupled between said first circular contact area and one of a power lead and a neutral lead of said electrical extension cord and the other of said pair of sliding contacts being coupled between said second circular contact area and the other of a power lead and a neutral lead of said electrical extension cord, and a cam-gear combination having a gear coaxial of said axle and secured to said reel adjacent said front wall to enable pulling said electrical extension cord from said reel to said desirable length, to enable locking said reel when said electrical extension cord has reached said desirable length, and to enable automatic retraction of said electrical extension cord onto said reel after use.

18. An electrical extension cord according to claim 17, further including at least one electrical receptacle disposed in said front wall connected to at least said power terminal and said neutral terminal.

19. An electrical extension cord according to claim 17, further including a plurality of electrical receptacles disposed in said front wall each connected to at least said power terminal and said neutral terminal.

20. An electrical extension cord according to claim 17, further including a pulley disposed within said housing adjacent said at least one aperture in said front wall to ease the passing of said electrical extension cord through said at least one aperture.

* * * * *